United States Patent

Plehal

[15] 3,700,974

[45] Oct. 24, 1972

[54] ELECTROLYTIC CELL WITH INNER ELECTRODE HAVING NON-REACTIVE SURFACE

[72] Inventor: Edward J. Plehal, 5321 De Roja Avenue, Woodland Hills, Calif. 91364

[22] Filed: Nov. 10, 1971

[21] Appl. No.: 197,454

Related U.S. Application Data

[60] Division of Ser. No. 871,583, Nov. 10, 1969, which is a continuation of Ser. No. 610,140, Jan. 18, 1967, abandoned.

[52] U.S. Cl. ..................................317/230, 29/570
[51] Int. Cl. ...............................................H01g 9/04
[58] Field of Search .........317/230, 231, 233; 324/94

[56] References Cited

UNITED STATES PATENTS

| 3,512,049 | 5/1970 | Hoberman et al. | 317/230 |
| 3,423,648 | 1/1969 | Mintz | 317/231 |
| 3,423,643 | 1/1969 | Miller | 317/231 |
| 3,210,662 | 10/1965 | Steinmetz et al. | 324/94 |

*Primary Examiner*—James D. Kallam
*Attorney*—Smyth, Roston & Pavitt

[57] ABSTRACT

The present invention relates to a particular structure for electrolytic cells. The present invention is particularly directed to structures for the inner electrodes of electrolytic cells and to methods of manufacturing such inner electrode structures wherein a base member is provided which is formed under pressure and which requires a thin layer of an inert material to be plated on the base member.

10 Claims, 12 Drawing Figures

PATENTED OCT 24 1972 3,700,974

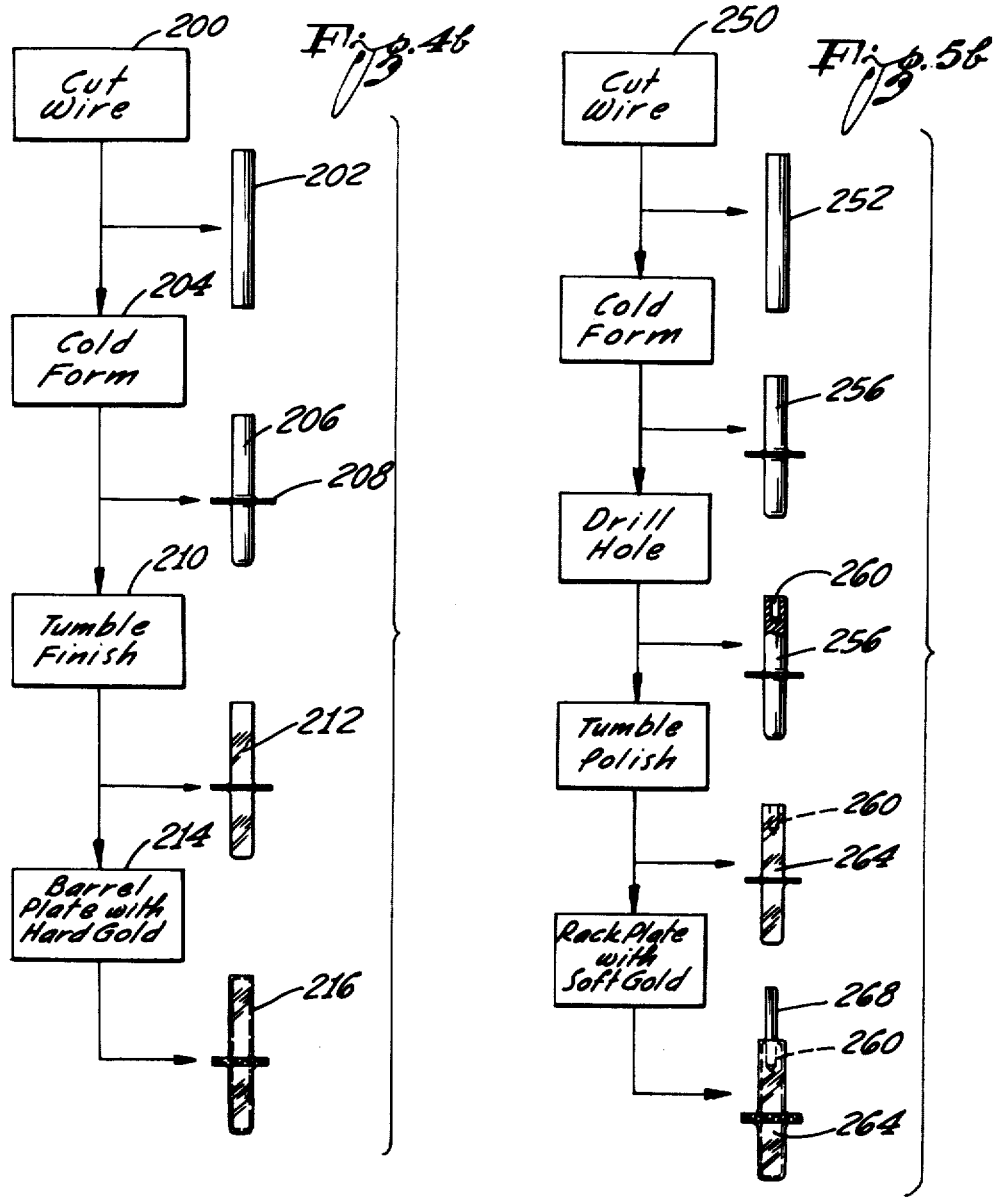

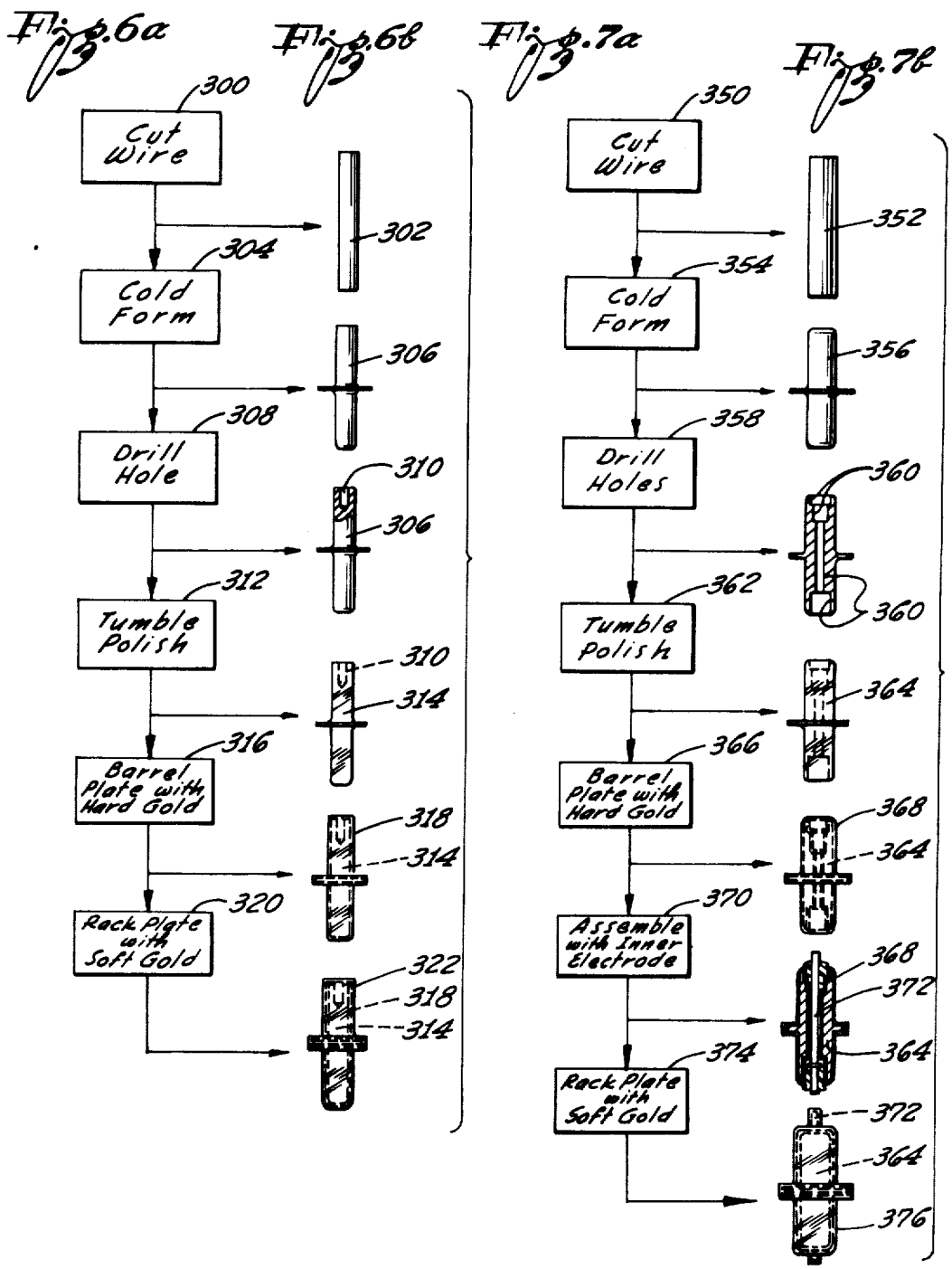

ELECTROLYTIC CELL WITH INNER ELECTRODE HAVING NON-REACTIVE SURFACE

This is a division of application Ser. No. 871,583 filed Nov. 10, 1969, which was a continuation of application Ser. No. 610,140 filed Jan. 18, 1967, and now abandoned.

The present invention, in particular, relates to electrolytic cells which are relatively inexpensive compared to prior art electrolytic cells yet are highly reliable and are uniform in electrical characteristics. Also, the present invention relates to methods of manufacturing electrolytic cells which methods are easily performed on a mass production basis so as to reduce the cost of the electrolytic cell and so as to insure uniformity in the finished structure and performance of the electrolytic cell.

Electrolytic cells of the type described with reference to the present invention usually consist of at least two electrodes which are maintained in contact with an electrolyte. One of the electrodes includes an active material which can be plated on the other electrode and the other electrode has a platable surface such as a surface of an inert material. For example, the active platable material may be silver and the inert material may be gold. It is to be appreciated that other active and inert materials may be used in place of the gold and silver but the combination of gold and silver provides for a reliable electrolytic cell.

One type of prior art electrolytic cell includes an outer electrode wherein the outer electrode also serves as an outer housing for the electrolytic cell. The outer electrode which serves as an outer housing is closed at one end and open at the other end. An electrolyte is contained within the outer electrode and an inner electrode extends into the outer electrode from the open end. The inner electrode is, therefore, in contact with the electrolyte. Since the inner electrode extends from the open end of the outer electrode the entire electrolytic cell must be sealed across the open end of the outer electrode.

As an example, an electrolytic cell of the above type and having a flanged inner electrode is shown in copending application Ser. No. 519,634 filed on Jan. 10, 1966, in the name of Martin Mintz and assigned to the same assignee as the instant application. In addition, an electrolytic cell of the type discussed above and having a multiple inner electrode structure is disclosed in copending application Ser. No. 587,590 filed Oct. 18, 1966, in the names of Edward J. Plehal, Gene Frick and Martin Mintz, and assigned to the same assignee as the instant application. As indicated above, the active and inert materials may be silver and gold and when such active and inert materials are used the electrolyte may be silver phosphate ($Ag_3PO_4$ in a solution of phosphoric acid ($H_3PO_4$) as disclosed in copending application Ser. No. 554,003 filed May 31, 1966, in the name of Edmund A. Miller and assigned to the same assignee as the instant application Electrolytic cells as shown in the copending applications and as shown in the present application may be used to provide various integration and timing functions. For example, copending application Ser. No. 179,847 filed Mar. 15, 1962, in the name of Thomas B. Bissett and assigned to the same assignee as the instant application shows various integration and timing uses of electrolytic cells. It is to be appreciated that one limitation in the widespread use of such electrolytic cells for many timing and integration functions is the cost of these electrolytic cells. It is, therefore, important to reduce the cost of the electrolytic cells while maintaining the reliability and uniformity of the electrolytic cells.

Prior art electrolytic cells such as the electrolytic cells shown in copending application Ser. No. 519,634 had an inner electrode, usually composed of a base material such as silver, plated with a heavy layer of substantially pure gold. The use of an inner electrode plated with a heavy layer of gold was relatively expensive. For example, base material of the inner electrode such as silver was machined to the desired size and then polished. After the machining and polishing the base material still had a relatively rough surface. The gold plating had to be relatively thick so as to substantially fill in all of the rough surface portions of the base material.

Since the gold had to be plated to a relatively thick layer, it was desirable to use substantially pure soft gold which will build up to a heavy layer. In addition, since the gold was soft, it was necessary to use a rack plating process to minimize marring the surface of the gold. In a rack plating process the individual electrodes are held suspended in a plating solution. Rack plating is relatively time consuming and expensive since a great deal of individual handling of parts is required and rack plating it not amenable to mass production technique. It would be desirable to use a mass production technique such barrel plating but barrel plating requires the use of a hard gold, and it is difficult to plate hard gold to the thickness required with the prior art electrolytic cells.

The above difficulties were experienced with base materials other than silver when the base materials were machined since the machining produced relatively rough surfaces. Another difficulty experienced with the prior art electrolytic cells is that when a thick layer of gold is plated so as to fill in the rough surface of the base material, the thick layer of gold has a matte finish. The matte finish does have certain advantages. For example, when large quantities of active material are to be deposited on the gold, the matte finish provides for a better adherence of the active material to the gold. Also the matte finish allows more active material to be plated, since the matte finish provides for a larger surface area. However, most requirements for the present electrolytic cells do not need such a large deposition of active material. In addition although the matte finish allows more active material to be plated, the plating is not as accurate for the depositing of small quantities of active material.

The present invention is directed to reliable low-cost electrolytic cells and methods of manufacturing such electrolytic cells. Specifically, the present invention is directed to structures for and methods of manufacturing the inner electrode portions of the electrolytic cells. The inner electrodes of the electrolytic cells of the present invention are constructed of inexpensive base material such as soft steel. The inexpensive base material such as soft steel is formed under pressure such as by cold forming to a desired configuration for the base member. The forming under pressure, such as by cold forming, provides for a relatively smooth surface for the base member and, in addition, the forming under pressure compacts the surface of the base member so as to provide for a harder surface portion.

The base member after the forming under pressure may now be subjected to a polishing operation so as to remove any irregularities or rough portions on the base member. Since the base member is composed of a metal such as soft steel, and since the surface of the base member has been compacted and is relatively hard, the polishing may be accomplished by mass production commercial methods such as by tumble polishing. A method such as tumble polishing is relatively low in cost since the handling of the parts are minimized. It would not be possible to use such mass production polishing methods such as tumble polishing with the prior art electrode, since these polishing methods would produce irregularities in the surface of a base material such as silver.

After the base member has been tumble polished, it is then plated with a layer of gold. It is not necessary to use a thick layer of gold since the surface of the base member is relatively smooth and a thin layer of gold provides for an adequate covering of all of the remaining irregularities in the surface of the base member after the polishing. For example, the base member may be plated with a hard gold using a mass production technique such as barrel plating. Depending upon the particular use of the electrolytic cell a single layer of hard gold may provide for an adequate plating surface for the active material. The hard gold solutions used for plating generally are not pure gold but have slight impurities which provide for an alloying of the gold. Also some hard gold plating solutions are relatively pure gold which provide for a hardness of the gold due to a particular alignment of the crystal structure of the gold.

In addition to the hard gold plating described above the base member may be plated with a substantially pure soft gold. When the base member is plated with the substantially pure soft gold the gold is plated at a much thinner layer than with gold layers in prior art electrolytic cells. The plating of the soft gold is usually accomplished by rack plating. However, the electrolytic cells of the present invention would be less expensive than the prior art electrolytic cells since the rack plating is necessary for a shorter period of time and with a lesser amount of gold than the prior art cells. The present invention also includes the provision of a double layer of gold. The double layer of gold includes a first preliminary plating of the base member with hard gold by a mass production technique such as barrel plating and a second outer plating of soft gold by a technique such as rack plating.

A clearer understanding of the invention will be had with reference to the following description and drawings wherein:

FIG. 4a illustrates a first method for manufacturing an inner electrode in accordance with the present invention;

FIG. 4b illustrates the structure of the inner electrode after each of the steps of the method of FIG. 4a;

FIG. 5a illustrates a second method for manufacturing an inner electrode in accordance with the present invention;

FIG. 5b illustrates the structure of the inner electrode after each of the steps of FIG. 5a;

FIG. 6a shows a third method of producing an inner electrode in accordance with the present invention;

FIG. 6b illustrates the structure of the inner electrode after each of the individual steps of FIG. 6a;

FIG. 7a illustrates an example of one method of producing a dual inner electrode in accordance with the present invention; and FIG. 7b illustrates the structure of the dual inner electrode after the various steps of FIG. 7a.

Figure 1:
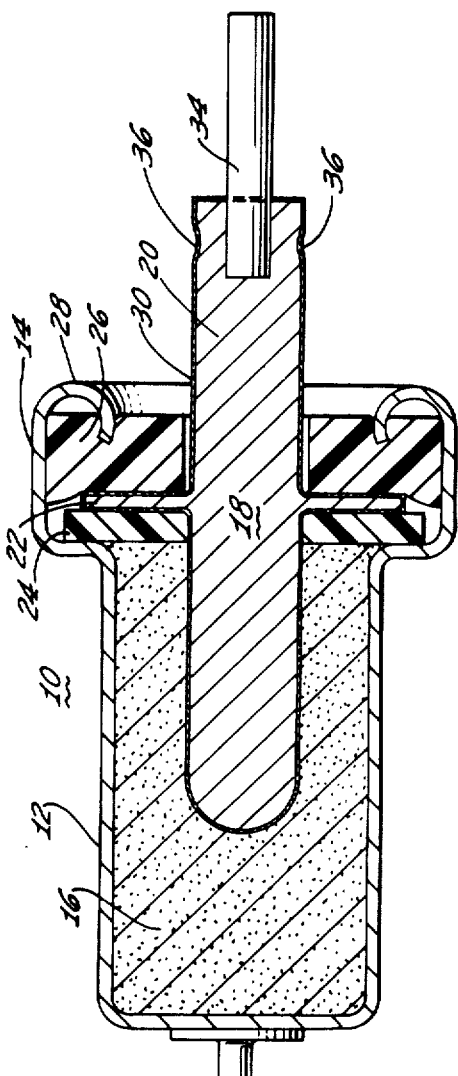
FIG. 1 illustrates an electrolytic cell having a single inner electrode which is constructed in accordance with the present invention.

In FIG. 1, an electrolytic cell 10 is illustrated. The electrolytic cell 10 includes an outer electrode 12 which also serves as an outer housing. The outer electrode 12 has a closed end and an open end and an enlarged open end 14. The outer electrode 12 is constructed of an active material such as silver or includes a plating of an active material such as silver. An electrolyte 16 is contained within the outer electrode 12. An inner electrode 18 extends into the electrolyte 16 from the enlarged open end 14 of the outer electrode 12. The inner electrode 18 includes a base member 20 which has been formed under pressure to have an outwardly extending flange member 22. The flange member 22 is sandwiched between a pair of insulating members 24 and 26 so as to seal the inner electrode 18 across the enlarged open end 14 of the outer electrode 12. A portion 28 of the enlarged open end 14 is crimped over so as to form the seal using the insulating members 24 and 26, and the flange 22.

The inner electrode 18, as indicated above, has the base member 20 formed under pressure to the particular desired shape which for example may take the shape shown in FIG. 1. The forming under pressure of the base member 20 provides for a relatively smooth surface for the base member 20 and also provides for a compacting of the base member 20 so that the surface of the base member is relatively hard. The base member 20, for example, may be constructed of a soft steel and the forming under pressure may be a cold forming operation. Prior to the cold forming operation, the steel is generally cleaned so as to eliminate the possibility of inclusions or other irregularities which might be produced in the surface of the base member by the cold forming due to oxide, carbon or other particles on the surface of the steel.

It is to be appreciated that the inner electrode 18 may have the base member 20 constructed of other materials which may be formed under pressure and, in addition, forming methods other than cold forming may be used such as hot forming, heading, coining, etc. The particular method used to form the base member 20 depends upon the particular configuration of the base member 20 and the particular desired shape. For example, if a more exotic shape that that shown in FIG. 1 is needed for the base member, a hot forming operation may be used since it is easier to form such exotic shapes using hot forming. In the particular embodiment shown in FIG. 1, the flange member 2 and the external configuration of the base member 20 is produced cheaply and easily using a cold forming of soft steel.

After the base member 20 has been formed, the member 20 may be polished and a plating 30 of inert material such as gold is deposited on the base member 20. The plating 30 of inert material such as gold is relatively thin and, for example, the gold plating is much thinner than the gold platings used on prior art electrolytic cells. The smooth surface of the base member 20 allows for a thinner coating of inert material such as gold since the inert material does not have to fill the irregularities present in the surface of the prior art base members.

The electrolytic cell of FIG. 1 also includes a pair of leads 32 and 34 which are attached to the outer electrode and inner electrode. The lead 32 may be attached by a method such as soldering or welding, whereas the lead 34 may be attached by fitting the lead 34 within a hole in the inner electrode 18 and then physically deforming the end of the inner electrode 18 by crimps 36 so as to attach the lead 34 to the inner electrode 18.

Figure 2:
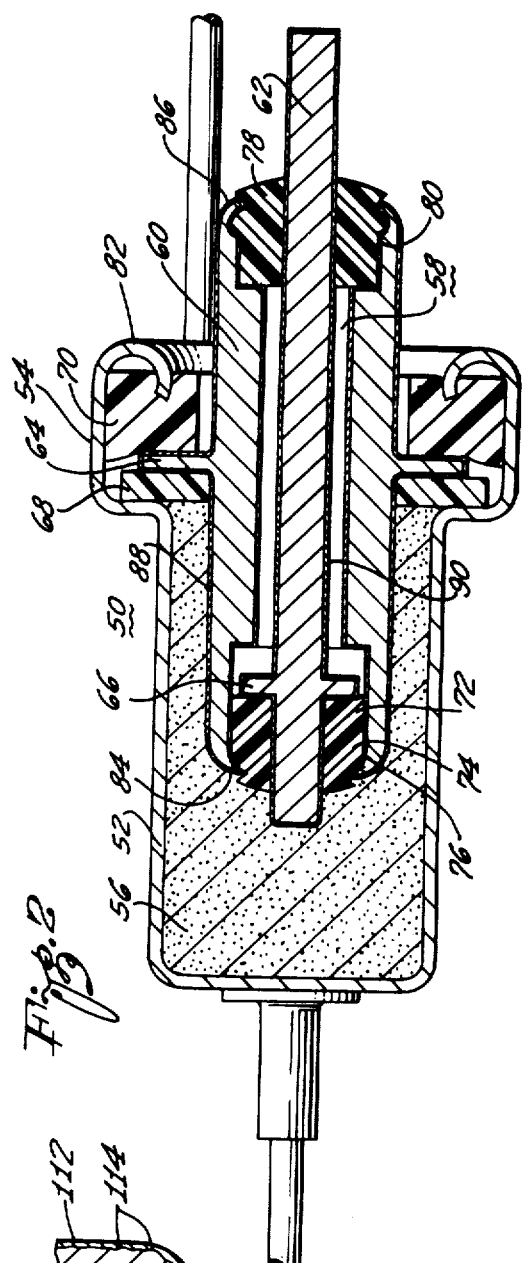
FIG. 2 illustrates an electrolytic cell having a dual inner electrode which is constructed in accordance with the present invention.

FIG. 2 illustrates an electrolytic cell 50 similar to the electrolytic cell of FIG. 1, except having a dual inner electrode. The electrolytic cell 50 includes an outer electrode 52 which has a closed end and an enlarged open end 54. The outer electrode 52 is constructed of an active material such as silver or at least has a plating of the active material such as silver. An electrolyte 56 is disposed in the outer electrode 52. A dual inner electrode 58 includes a pair of base members 60 and 62. The base member 60 has an outwardly extending flange 64 and the base member 62 has an outwardly extending flange 66.

Both base members 60 and 62 are formed to their desired shape under pressure and both members may be formed by the cold forming of a material such as soft steel. The base member 60 may be formed by deforming a tubular member under pressure or the member 60 may be formed by deforming a wire or rod under pressure. When the member 60 is formed from a wire or rod the interior configuration is provided for by successive drilling operations on the face member 60.

The member 60 is sealed across the open end 54 of the outer electrode 52 by the use of a pair of insulating members 68 and 70 sandwiching the flange 64. The member 62 is sealed within the member 60 by a pair of insulating members 72 and 74 sandwiching the flange 66 within a recess 76 in the base member 60. Also, an insulating member 78 is disposed within a recess 80 within the base member 60 to insure the separation between the members 60 and 62. The actual sealing is performed for both the inner electrodes by crimping operations. For example, a portion 82 of the outer electrode 52 is crimped to seal the open end of the outer electrode 52. Also, a portion 84 of the base member 60 is crimped to provide sealing of the member 62 within the member 60 at the interior portion of the electrolytic cell. Finally, a portion 86 of the base member 60 is crimped to provide sealing between the members 60 and 62 at the outer portion of the electrolytic cell 50.

The outer surface of the member 60 is covered with a layer of gold or other inert material 88. In addition, the outer surface of the member 62 is covered with a layer of gold or other inert material 90. For both members 60 and 62 the layers of gold 88 and 90 are relatively thin and are not as thick as the gold layers used in the prior art electrolytic cells. The gold may be relatively thin since the inner electrodes 60 and 62 are produced by a forming operation which produces a relatively smooth and compact surface. Also, since the members 60 and 62 may be formed from material such as steel which has a relatively hard surface, the members may be polished using commercial mass production techniques such as tumble polishing to eliminate irregularities in the surface.

The actual method of plating the gold on the inner electrodes of the electrolytic cells of FIGS. 1 and 2 may take a variety of forms depending on the particular use of the electrolytic cell. For example, the inner electrodes may contain a single layer of relatively hard gold which is plated using a commercial mass production technique such as barrel plating. Also, the inner electrodes may be plated with a relatively soft gold using a plating technique such as rack plating. Finally, the inner electrodes may be double plated, first with hard gold and then with soft gold. As indicated above, the particular method depends upon the use of the electrolytic cell and takes into consideration such factors as the amount of active material which is to be deposited on the gold surface and the accuracy and sensitivity of the electrolytic cell. With any of the plating processes, however, the amount of gold which is plated is relatively low compared to the prior art electrolytic cells.

Figure 3A:
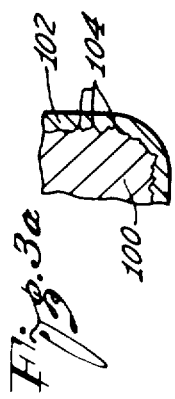
FIG. 3a illustrates a fragmentary view of a portion of a prior art inner electrode showing the base material and the layer of inert material.
Figure 3B:
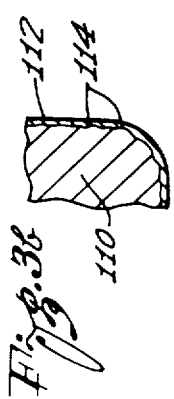
FIG. 3b illustrates a fragmentary view of a portion of an inner electrode of the present invention showing the base material and the layer of inert material.

With reference to FIGS. 3a and 3b, a comparison of inner electrode structures of the prior art and of the present invention is illustrated. In FIG. 3a a portion of an inner electrode having a base member 100 and a plating of inert material such as gold 102 is shown. The base member 100 has a relatively rough surface with many pits and irregularities 104, and in order to provide for a relatively smooth inner electrode plating surface the layer of gold or other inert material 102 must be relatively thick so as to fill in all of the irregularities.

In order to provide such a thick layer of gold, it is necessary to use relatively slow expensive plating techniques such as rack plating with substantially pure gold. The use of such techniques does provide for a satisfactory inner electrode surface, but the cost of the inner electrode is relatively expensive due to the cost of the materials and the cost of the labor to perform the hand operations. In addition, the layer of gold 102 being relatively thick has a matte finish rather than a shiny surface. In certain situations it is desirable to have a matte finish since it allows for the plating of larger quantities of active material. However, for low or normal quantities of active material it is not necessary to have such a matte finish and the provision of such a matte finish may impair the accuracy of the electrolytic cell.

FIG. 3b illustrates a fragmentary view of a portion of an inner electrode of an electrolytic cell constructed in accordance with the present invention and includes a base portion 110 which is coated with a layer of inert material 112 such as gold. As can be seen in FIG. 3b, the base portion 110 has a relatively smooth surface with small irregularities 114 and it is not necessary to use a thick layer of gold to fill in these irregularities. Therefore, the layer of gold 112 may be much thinner than the layer of gold 102 used with the inner electrode of FIG. 3a. Since the layer of gold may be thinner, it is now possible to use a commercial mass production technique for plating the gold.

FIGS. 4 through 7 shows various methods for manufacturing the inner electrode structures of the electrolytic cells of FIGS. 1 and 2. FIGS. 4, 5 and 6 illustrate methods for making the inner electrode structure of FIG. 1, and FIG. 7 illustrates an exemplary method for making the dual inner electrode structure of FIG. 2. It is to be appreciated that the dual inner electrode structure may also be made by other methods such as those shown in FIGS. 4, 5 and 6.

In FIG. 4a, the various steps of a method are shown and the particular structure which is produced by each step in the method is shown in FIG. 4b. The first step 200 in the method of FIG. 4a is to cut a selected predetermined length of wire or rod from a material such as soft steel to produce a blank and such a blank 202 is shown in FIG. 4b. It is to be appreciated that the steel may be cleaned before or after the step to remove any foreign particles from the surface of the steel. The second step 204 is to cold form the blank 202 into a desired shape for a base member 206. As can be seen, the member 206 includes an outwardly extending flange 208. In the cold forming operation the blank 202 is formed under pressure with dies to compress the metal and flow it outwardly to form the outwardly extending flange 208. The cold forming operation produces a relatively smooth and compact surface for the member 206 and the surface portion of the member 208 is hardened due to the forming operation.

A third step 210 is to polish the member 206 to produce a finished inner electrode base member 212. The polishing may be accomplished using a mass production technique such as tumble polishing wherein a plurality of members 206 are plated in a barrel in a container which also includes abrasive material. The container is tumbled so that the members 206 engage the abrasive material and the abrasive material smooths off the rough edges and irregularities on the surface of the members 206 to produce a polished base member 212.

A final step 214 of the process of FIG. 4a is to barrel plate the base member 212 with an inert material such as hard gold. Barrel plating is a commercial mass-production plating technique wherein the base members 212 are revolved in a barrel-container which includes a plating solution. The barrel also contains a plurality of electrodes and each time a base member 212 contacts an electrode a plating of the gold occurs on the surface of the base member. Since the members 212 are agitated and strike each other due to the revolution of the barrel container, it is not possible to use a soft gold such as a substantially pure gold, since this type of gold would nick and mar as it was being plated. The plating solution would contain a hard gold. Hard gold solutions are generally of two types. First, the gold may be alloyed with other materials so that the gold is harder than pure gold but less than 24 karats. Second the crystals of the gold may have a particular alignment so as to increase the hardness of the gold. Either type of hard gold plating solution is commercially available.

The final step 214 produces an inner electrode 216 which includes the layer of hard gold. It is to be appreciated that the method of FIG. 4a is relatively inexpensive since all the steps use reliable mass production techniques. For example, cold forming is a standard mass production technique for shaping metals and tumble polishing and barrel plating are also mass production techniques for polishing and plating metal parts. It is be appreciated, therefore, that the prior art electrolytic cells used inner electrodes produced by more expensive methods than those described above since these methods were thought necessary and the method of FIG. 4 substantially reduces the price of the inner electrode structure.

The method of FIG. 4 cannot be used for all electrolytic cells since the layer of hard gold is sometimes not sufficiently dense to provide a completely corrosion-free surface for the plating of the active material. In some uses where the electrolytic cell must sit for long periods of time, the electrolyte may produce a substantial leakage current through the hard gold. In such situations it is desirable to use a soft gold which is denser and does not allow for as large a leakage current through the layer of gold.

FIGS. 5 and 6 illustrate two methods for producing inner electrodes which have a higher tolerance for corrosion than that disclosed with reference to FIG. 4. In FIG. 5, the first step 250 is to cut the wire or rod into a desired blank 252. The second step 254 is to cold form the blank 252 into a rough base member 256. So far the method of FIG. 5 is identical to the method of FIG. 4. The third step 258, however, in the method of FIG. 5 is to drill a hole 260 into the rough base member 256. The base member 256 is then tumble polished in a fourth step 262 to remove any rough edges and irregularities to produce a polished base member 264. The polished member 264 is substantially identical to the polished member 212 in FIG. 4b except the member 264 includes the hole 260.

The final step 266 is to rack plate the member 264 with a layer of soft gold. The rack plating is accomplished by inserting a holding member 268 which may ultimately be the lead member into the hole 260 of the base member 264, and then suspending the entire base member 264 into a rack plating solution. In the rack plating all of the base members 264 are held in individual positions relative to the other base members and there is no contact between the base members. A plurality of such base members are then plated while they are suspended in the plating solution.

It is to be appreciated that the rack plating is much slower than the barrel plating disclosed with reference to FIG. 4. However, with the inner electrode of the present invention a much thinner layer of gold is required since the surface of the polished base members is relatively smooth. The thin layer of gold may be rack plated in a much shorter time than was possible with the prior art inner electrodes. The rack plated inner electrode produced by the process of FIG. 5 is, therefore, less expensive than the prior art rack plated inner electrodes.

FIG. 6 illustrates a method for producing an inner electrode structure having first and second layers of gold produced by barrel and rack plating. In FIG. 6, the first step 300 is to cut the wire or rod into blank 302.

The second step 304 is to cold form the blank 302 into a rough base member 306. A third step 308 is to drill a hole 310 in one end of the rough base member 306. A fourth step 312 is to tumble polish the rough base member 306 to produce a polished base member 314 having a smooth compact surface. The fifth step 316 is to barrel plate the polished base member 314 with a layer of hard gold 318.

The first four steps of the method of FIG. 6 are identical to the first four steps of the method of FIG. 5. However, the fifth step 316 is similar to the barrel plating step 214 of FIG. 4. The base member 314 now includes a layer of hard gold 318. As indicated above, sometimes the layer of hard gold is not sufficient to provide adequate corrosion protection and a final step 320 is to rack plate the member 314 which includes a first layer of hard gold 318 with a second layer of soft gold 322. The second layer of soft gold 322 is relatively thin and seals the surface of the first layer of hard gold 318.

A method similar to the method of FIG. 6 may be used to produce a dual inner electrode structure of the type shown in FIG. 2 and FIG. 7 illustrates such a method. In FIG. 7, a first step 350 is to cut a blank 352 from a wire or rod. A second step 354 is to cold form the blank 352 to form a rough base member 356. A third step 358 is to drill a series of holes either partially or completely through the base member 356 to form the interior openings 360 of the base member 356. It is to be appreciated that the rough base member 356 including the interior openings 360 may be produced by cold forming a piece of tubular material instead of the piece of solid wire or rod. The dies used in the cold forming operation would then include portions to produce the various interior openings 360.

After the rough base member 356 is formed with the openings 360 the fourth step 362 is to tumble polish the rough base member 356 to produce a polished base member 364. The polished base member 364 is then barrel plated in a fifth step 366 to provide a first layer of gold 368 on the base member 364. The base member 364 coated with the gold 368 is now ready for assembly in a sixth step 370 with an inner electrode 372.

The inner electrode 372 may have the form shown in FIG. 2 and it is to be appreciated that such an inner electrode is similar to the inner electrodes which have been formed by the methods of FIGS. 4, 5 and 6. For example, the method of FIG. 4 may be used to produce such an inner electrode 372. The inner electrode 372 produced by the method of FIG. 4 would be barrel plated in the manner shown in FIG. 4. In the process of FIG. 7 the two inner electrodes are assembled by the sixth step 370 to produce a composite dual inner electrode structure similar to that shown in FIG. 2.

The dual inner electrode structure is physically assembled by providing the appropriate crimping operations as disclosed with reference to FIG. 2 in the sixth step 370 of the method of FIG. 7. Since the crimping operations may provide for a removal of some of the hard gold, it may be desirable to replate the dual inner electrode. A final step 374 therefore is to plate a second layer of gold on the dual inner electrode structure. In the embodiment of FIG. 7 the second plating operation is shown to be rack plating with soft gold. It is to be appreciated that such a plating operation may be a second barrel plating operating with hard gold instead of the rack plating with soft gold. It is also to be appreciated that if the assembly operation does not substantially damage the hard gold and when the additional corrosion resistance is not necessary, it is sufficient to merely use a single plating operation for the dual electrode 372.

The present invention is, therefore, directed to electrolytic cells and specifically inner electrode structures for such electrolytic cells and to methods of producing such inner electrode structures which are less expensive than prior art inner electrode structures. The inner electrode structures of the present invention are less expensive since they use a smaller amount of inert material such as gold. The present invention provides for much thinner coatings of gold to achieve similar results to the heavier coatings of gold used for the prior art inner electrodes.

The present invention includes the production of a base member which is formed under pressure so as to have a smooth compact surface and to receive the plating of the inert material such as gold and wherein the amount of gold necessary to provide the plating surface is substantially lower than that necessary with prior art inner electrodes. The present invention is also directed to the various methods of producing such inner electrode structures wherein commercial mass production plating techniques may be incorporated so as to lower the cost of the inner electrodes of the present invention.

The inner electrodes of the present invention are low cost, mass produced and, through use of such mass production are uniform in dimensions. It is to be appreciated that the present invention has been disclosed with reference to particular embodiments. It is to be appreciated, however, that adaptations and modifications may be made and the present invention is only to be limited by the appended claims.

I claim:

1. An inner electrode member for use in an electrolytic cell, including
    a base member formed of an active metal and with the base member having a smooth compacted surface, and
    a layer of hard gold plated on the base member to cover the smooth compacted surface.

2. The inner electrode of claim 1 wherein the base member is formed of soft steel.

3. The inner electrode of claim 1 wherein the base member includes an outwardly extending flange portion and wherein the outwardly extending flange portion is plated with a layer of gold.

4. An inner electrode member for use in an electrolytic cell, including
    a base member formed of an active metal and with the base member having a smooth compacted surface,
    a first layer of hard gold plated on the base member to cover the smooth compacted surface, and
    a second layer of soft gold plated on the layer of hard gold.

5. The inner electrode member of claim 4 wherein the base member is formed of soft steel.

6. The inner electrode member of claim 4 wherein the base member includes an outwardly extending flange portion and wherein the outwardly extending flange portion is plated with the layers of hard and soft gold.

7. An electrolytic cell, including
an outer cup-shaped electrode having an open end and a closed end and with the open end including an enlarged portion,
an inner electrode including a flange portion fitting within the enlarged portion of the outer electrode and an elongated portion extending within the outer electrode, the inner electrode including
a base member formed of an active metal and with the base member having a smooth compacted surface,
a layer of hard gold plated on the base member to cover the smooth compacted surface, and
means disposed within the enlarged portion of the outer electrode for sealing the flange portion of the inner electrode within the enclosed portion of the outer electrode.

8. The electrolytic cell of claim 7 wherein the base member of the inner electrode is formed of soft steel.

9. An electrolytic cell, including an outer cup-shaped electrode having an open end and a closed end and with the open end including an enlarged portion,
an inner electrode including a flange portion fitting within the enlarged portion of the outer electrode and an elongated portion extending within the outer electrode, the inner electrode including
a base member formed of an active metal and with the base member having a smooth compacted surface,
a first layer of hard gold plated on the base member to cover the smooth compacted surface,
a second layer of soft gold plated on the layer of hard gold, and
means disposed within the enlarged portion of the outer electrode for sealing the flange portion of the inner electrode within the enlarged portion of the outer electrode.

10. The electrolytic cell of claim 9 wherein the base member of the inner electrode is formed of soft steel.

* * * * *